(12) United States Patent
Lueschow

(10) Patent No.: US 7,798,004 B2
(45) Date of Patent: Sep. 21, 2010

(54) MONITORING SYSTEM FOR MACHINE VIBRATION

(75) Inventor: Kevin Jay Lueschow, Elmwood, IL (US)

(73) Assignee: Caterpillar Inc, Peoria, IL (US)

( * ) Notice: Subject to any disclaimer, the term of this patent is extended or adjusted under 35 U.S.C. 154(b) by 286 days.

(21) Appl. No.: 12/010,605

(22) Filed: Jan. 28, 2008

(65) Prior Publication Data

US 2009/0188323 A1    Jul. 30, 2009

(51) Int. Cl.
*G01H 11/08* (2006.01)

(52) U.S. Cl. ............................. 73/661; 340/683; 701/50

(58) Field of Classification Search .................. 73/660, 73/661; 340/683
See application file for complete search history.

(56) References Cited

U.S. PATENT DOCUMENTS

| | | | |
|---|---|---|---|
| 5,813,989 A | 9/1998 | Saitoh et al. | |
| 6,575,902 B1 | 6/2003 | Burton | |
| 6,935,590 B2 | 8/2005 | Karwaczynski | |
| 7,109,872 B2 | 9/2006 | Balaban et al. | |
| 7,164,117 B2 | 1/2007 | Breed et al. | |
| 7,210,356 B2 | 5/2007 | Bernhagen | |
| 7,243,945 B2 | 7/2007 | Breed et al. | |
| 7,256,686 B2 | 8/2007 | Koutsky et al. | |
| 7,578,193 B2 * | 8/2009 | Davidson ...................... | 73/661 |
| 2004/0239491 A1 * | 12/2004 | Koutsky et al. ............. | 340/438 |
| 2006/0000656 A1 | 1/2006 | Bisick et al. | |
| 2006/0155175 A1 | 7/2006 | Ogino et al. | |
| 2006/0185434 A1 * | 8/2006 | Bernhagen ................... | 73/649 |
| 2007/0038354 A1 * | 2/2007 | Kang .......................... | 701/50 |
| 2008/0134794 A1 * | 6/2008 | Jonsson ....................... | 73/660 |
| 2009/0100933 A1 * | 4/2009 | Brunson et al. ............... | 73/577 |

FOREIGN PATENT DOCUMENTS

| | | |
|---|---|---|
| EP | 0 815 420 B1 | 9/2001 |
| EP | 1 481 841 A2 | 12/2004 |
| EP | 1 672 336 A1 | 6/2006 |
| GB | 2 411 472 A | 8/2005 |
| WO | WO 2006/080880 A1 | 8/2006 |

* cited by examiner

*Primary Examiner*—Hezron Williams
*Assistant Examiner*—Rose M Miller
(74) *Attorney, Agent, or Firm*—Finnegan, Henderson, Farabow, Garrett & Dunner LLC

(57) ABSTRACT

A system for monitoring an exposure of a machine operator to machine vibration is provided. The system includes an operator safety restraint. The system also includes at least one vibration sensor on the safety restraint and configured to generate a signal indicative of operator exposure to machine vibration. The system further includes a controller configured to receive the signal and configured to determine an amount of vibration exposure of the machine operator based on the signal.

20 Claims, 4 Drawing Sheets

MONITORING SYSTEM FOR MACHINE VIBRATION

TECHNICAL FIELD

This disclosure relates generally to a monitoring system and, more particularly, to a monitoring system for machine vibration.

BACKGROUND

Built with advanced technologies, modern machines can have large power-to-weight ratios and/or operate at high speed. High speed or large power-to-weight ratios may cause increased vibration of the machines and/or vibration of various parts of the machines. An operator of a modern machine may be exposed to such vibration, which may be measured as hand-arm vibration and whole body vibration. Whole body vibration, which may be transmitted to the entire human body, may have adverse health effects on the operator under a prolonged exposure.

Whole body vibration measurement techniques have been recently developed to measure whole body vibration on a human body. For example, International Publication No. WO 2006/080880 ("the '880 publication"), by Jonsson, discloses a dosimeter for vibration measurements. The dosimeter is configured to be attached to a superficial skeleton part of the body of a driver of a vehicle. However, implementing the dosimeter of the '880 publication may be problematic. The dosimeter of the '880 publication is a detachable component, and its effectiveness in measuring vibrations is wholly dependent on the driver remembering to properly secure the dosimeter to his body before operating a vehicle.

The disclosed monitoring system is directed to improvements in the existing technology.

SUMMARY

One aspect of the present disclosure relates to a system for monitoring an exposure of a machine operator to machine vibration. The system may include an operator safety restraint. The system may also include at least one vibration sensor engaged with the safety restraint and configured to generate a signal indicative of operator exposure to machine vibration. The system may further include a controller configured to receive the signal and configured to determine an amount of vibration exposure of the machine operator based on the signal.

Another aspect of the present disclosure relates to a method for determining an exposure of a machine operator to machine vibration. The method may include operatively associating a safety restraint with a machine operator. The method may also include detecting machine vibration directed to the machine operator with a sensor engaged with the safety restraint. The method may further include generating a signal with the sensor that is indicative of operator exposure to machine vibration. The method may still further include processing the signal and determining an amount of vibration exposure of the machine operator.

DETAILED DESCRIPTION

Figure 1:
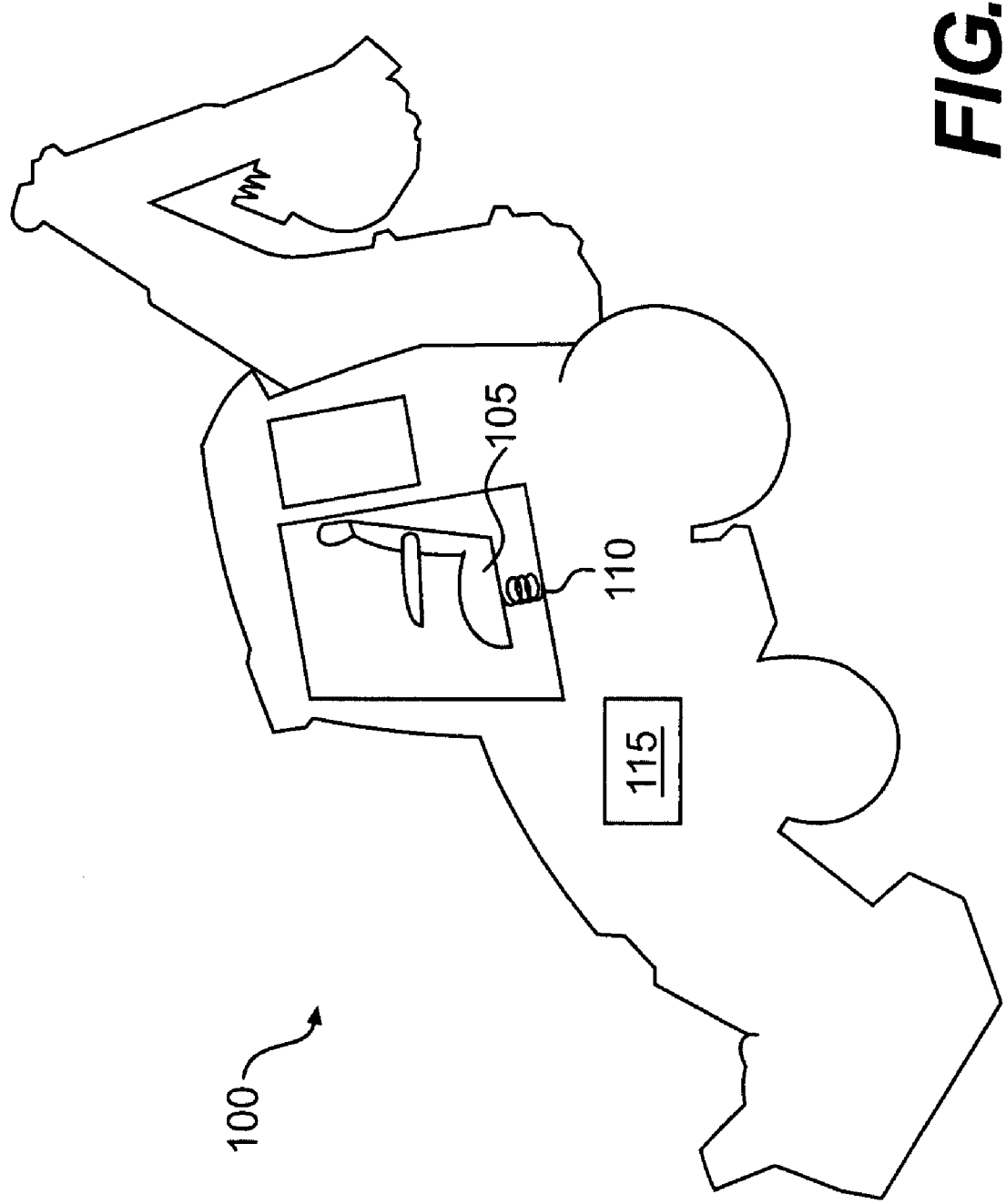
FIG. 1 is a pictorial illustration of a machine that may incorporate certain disclosed embodiments.

Reference will now be made in detail to certain disclosed embodiments, which are illustrated in the accompanying drawings. Wherever possible, the same reference numerals will be used throughout the drawings to refer to the same or like parts.

FIG. 1 illustrates a machine 100 in which features and principles consistent with certain disclosed embodiments may be incorporated. Machine 100 may refer to any type of fixed or mobile machine that performs some type of operation associated with a particular industry, such as mining, construction, farming, transportation, etc., and operates between or within work environments (e.g., construction site, mine site, power plants, on-highway applications, etc.). Although, as shown in FIG. 1, machine 100 is illustrated as a backhoe loader, it is contemplated that machine 100 may be any type of machine. Further, machine 100 may be a conventionally powered, hybrid electrical powered, and/or fuel cell powered machine.

Figure 2:
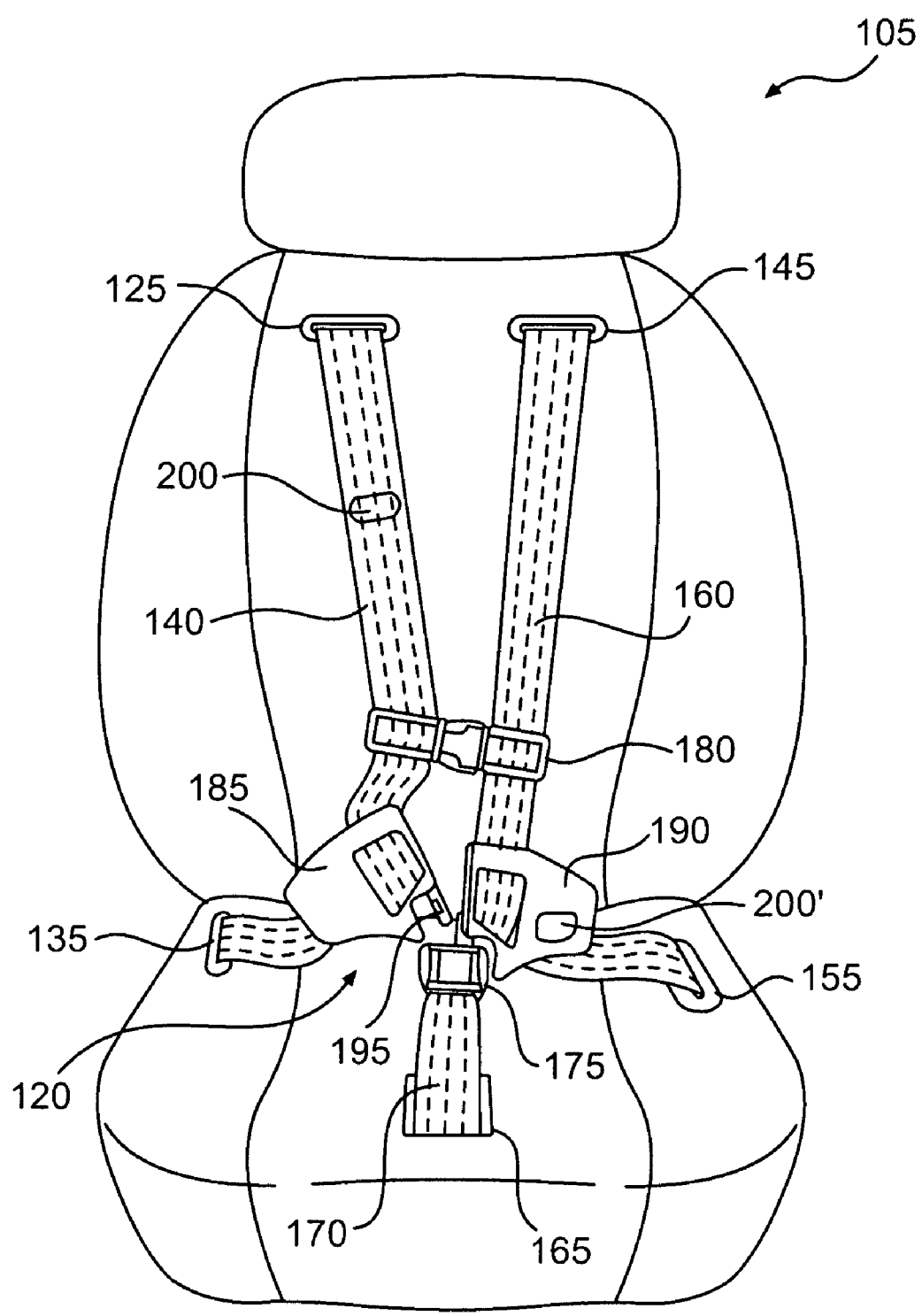
FIG. 2 illustrates a safety restraint system that may be used with certain disclosed embodiments.

As diagrammatically illustrated in FIG. 1, machine 100 may include an operator seat 105, a support 110 for operator seat 105, and a monitoring system 115. Support 110 may include a suspension mechanism configured to at least partially isolate an operator occupying operator seat 105 from machine vibration. For example, a suspension mechanism in support 110 may include any of various hydraulic, pneumatic, and/or mechanical suspension devices that may permit a degree of isolation of operator seat 105 from machine vibration. Referring to FIG. 2, operator seat 105 may include a safety restraint system 120. Safety restraint system 120 may include belt and fastener arrangement suitable for securing an operator in operator seat 105 without inhibiting the operator's ability to operate machine 100. For example, safety restraint system 120 is illustrated in FIG. 2 as a five point harness system. Other safety restraint systems with fewer components, including those with lap belts only or a lap belt and single shoulder strap combination, for example, are contemplated.

Taking right and left from an operator's perspective in FIG. 2, the illustrated five point harness system may include a right shoulder belt receiver 125 and a right lap belt receiver 135, which may receive a portion of a belt 140. The harness system may also include a left shoulder belt receiver 145 and a left lap belt receiver 155, which may receive a portion of a belt 160. Additionally, a crotch belt receiver 165 may be provided to receive a belt 170. Belts 140, 160 and 170 may be anchored in operator seat 105. For example, belt 140 may include two ends, with a first end anchored near a top left portion of operator seat 105 through right shoulder belt receiver 125, and a second end anchored near a bottom left portion of operator seat 105 through right lap belt receiver 135. Similarly, belt 160 may be anchored through left shoulder belt receiver 145 and left lap belt receiver 155. Belt 170 may include two ends, with a first end being received by crotch belt receiver 165 and anchored in operator seat 105, and a second end attached to a fastening member 175.

Safety restraint system 120 may include two connector members 185 and 190. Connector members 185 and 190 may be plate-like components. Connector member 185 may be located on belt 140 and between right shoulder belt receiver 125 and right lap belt receiver 135. Similarly, connector member 190 may be located on belt 160 and between left shoulder belt receiver 145 and left lap belt receiver 155. Connector member 185 may include an extension member 195 configured to be received by fastening member 175. Connector member 190 may likewise include an extension member (not shown) configured to be received by fastening member 175. Safety restraint system 120 may also include a two-piece fastener 180 attached to belts 140 and 160.

Still referring to FIG. 2, at least one vibration sensor 200 may be provided to measure whole body vibration exposure levels of an operator on machine 100. Vibration sensor 200 may be any appropriate type of vibration sensor that may detect vibration on an x-axis, y-axis, and z-axis, i.e., in three dimensions. With respect to operator seat 105, the x-axis may extend horizontally from front to back of operator seat 105, the y-axis may extend horizontally from right to left of operator seat 105, and the z-axis may extend vertically from top to bottom of operator seat 105. Vibration sensor 200 may include, for example, an accelerometer. Vibration sensor 200 may be configured to convert detected vibration on the x-axis, y-axis, and z-axis into separate electrical signals, or may integrate detected vibration into one combined electrical signal. For example, vibration sensor 200 may be configured to detect vibration along the three axes (i.e., the x-axis, y-axis, and z-axis) and convert the detected vibration into three separate electrical signals, each representing the detected vibration of a respective x-axis, y-axis, or z-axis. Alternatively, vibration sensor 200 may be configured to detect vibration on the axes and may be configured to convert the detected vibration into one combined electrical signal indicative of the detected vibration along all of the axes. In yet another embodiment, vibration sensor 200 may include multiple vibration sensors, each detecting vibration along a different axis. For example, vibration sensor 200 may include three vibration sensors each detecting vibration along each one of the x-axis, y-axis, and z-axis. Each of the three vibration sensors may be configured to detect vibration and may be configured to convert detected vibration of the respective axis into an electrical signal representative of the vibration detected.

Figure 3:
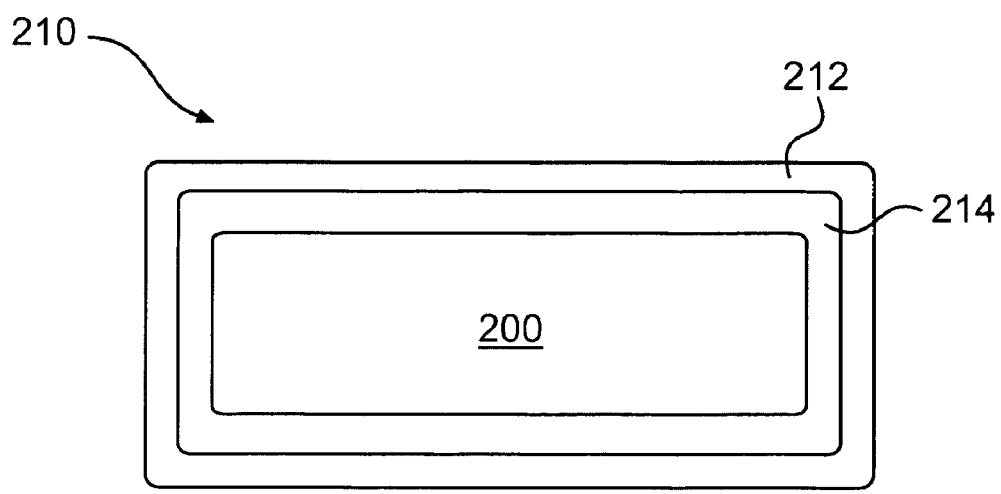
FIG. 3 illustrates a barrier system that may be used with certain disclosed embodiments.
Figure 4:
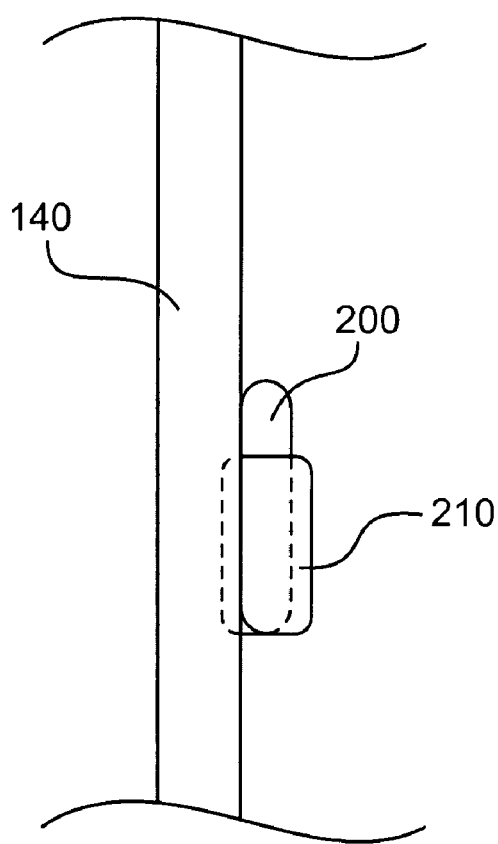
FIG. 4 illustrates a side view of the barrier system of FIG. 3 in engagement with certain portion of the safety restraint system of FIG. 2.

Vibration sensor 200 may be engaged directly or indirectly with a portion of safety restraint system 120. An example of engaging vibration sensor 200 with a portion of safety restraint system 120 indirectly may include the use of a barrier system 210 as shown in FIGS. 3 and 4. As illustrated in FIG. 3, for example, at least a portion of vibration sensor 200 may be protectively surrounded by one or more of a variety of polymers in one or more layers in order to protect vibration sensor 200 from contamination and corrosion due to dirt, dust, and moisture, and from physical damage. For example, as shown in FIG. 3, vibration sensor 200 may be surrounded by layers 212 and 214. It is contemplated that more or less layers may be used to surround vibration sensor 200. As depicted in FIG. 4, barrier system 210 may be directly engaged with a portion of safety restraint system 120, such as belt 140.

Still referring to FIGS. 3 and 4, barrier system 210 may completely or partially surround vibration sensor 200. Barrier system 210 may be engaged with the portion of safety restraint system 120 via a clip (not shown), whereby barrier system 210 may be removed from engagement with one portion of safety restraint system 120 and may be engaged with another portion of safety restraint system 120. Alternatively, barrier system 210 may be more permanently engaged with a portion of safety restraint system 120. For example, barrier system 210 may be sewn or otherwise integrated into a portion of belt 140, or engaged by suitable mechanical fasteners, adhesives, etc., so that barrier system 210 may not be readily detached from safety restraint system 120. While vibration sensor 200 is shown to be engaged with a portion of belt 140 and a vibration sensor 200' is shown to be engaged with a portion of fastening member 190, it is contemplated that vibration sensor 200 may be engaged with any portion of safety restraint system 120, such as belts 140, 160 and 170, fastening member 175, connector members 185 and 190, two-piece fastener 180, and/or any other appropriate portion of safety restraint system 120. It is also contemplated that multiple vibration sensor 200 may be engaged with different portions of safety restraint system 120.

Figure 5:
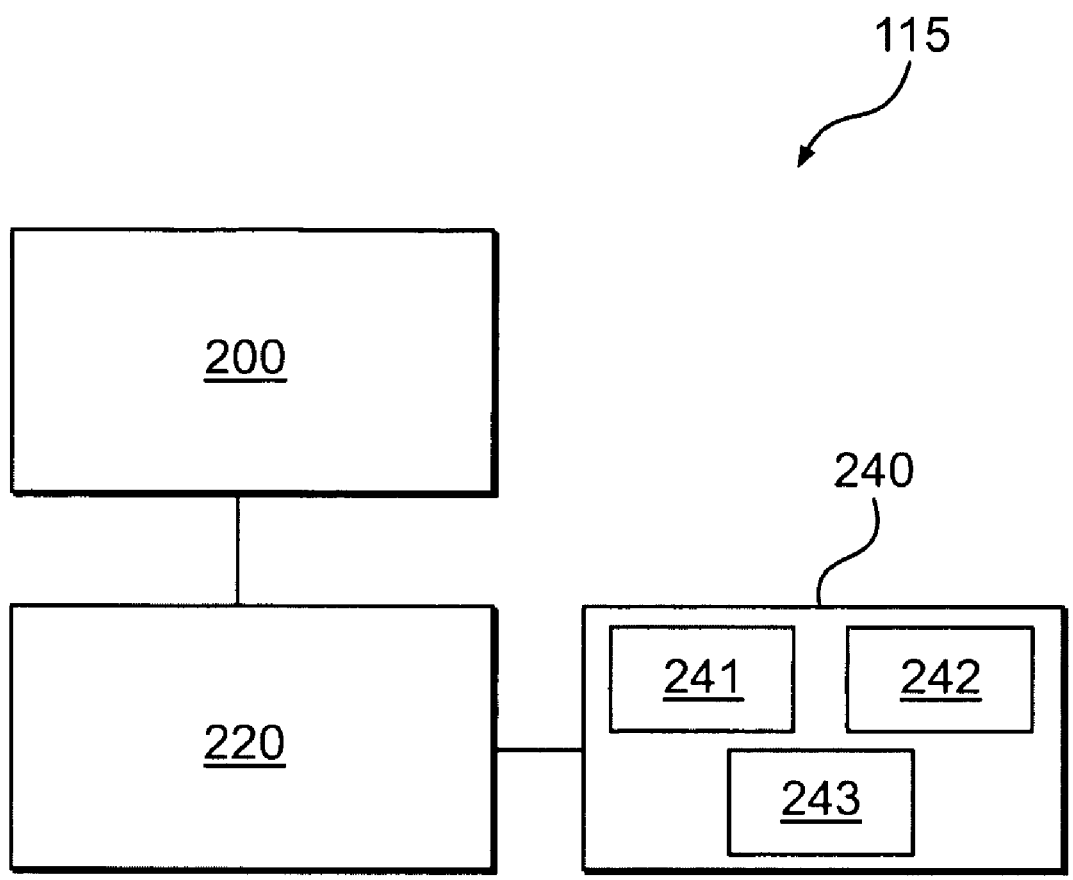
FIG. 5 illustrates a block diagram representation of a monitoring system consistent with certain disclosed embodiments.

FIG. 5 is a schematic block diagram representation of monitoring system 115 (generally designated in FIG. 1) that may be utilized to measure whole body vibration exposure levels experienced by an operator on machine 100. Monitoring system 115 may include vibration sensor 200 (generally designated in FIG. 2), a controller 220, and an output device 240. Vibration sensor 200 may be configured to provide controller 220 with electrical signal(s) representative of a measurement of the amount of whole body vibration exposure levels experienced by the operator on machine 100. The electrical signal(s) may be provided to controller 220 via a cable connecting vibration sensor 200 to controller 220. Alternatively, the electrical signal(s) may be provided to controller 220 via wireless communication. Controller 220 may include any device suitable for running a software application. For example, controller 220 may include a central processing unit, random access memory, one or more memory storage devices, and input/output modules, etc. In one embodiment, controller 220 may be integrated with and/or correspond to an electronic control unit of machine 100. Controller 220 may be configured to process the electrical signal(s) provided by vibration sensor 200 to determine the amount of whole body vibration exposure levels experienced by the operator on machine 100. Controller 220 may subsequently generate an output signal representative of the measurement of the whole body vibration exposure levels experienced by the operator on machine 100.

Output device 240 may be configured to receive the output signal from controller 220 and generate a response to the output signal. Output device 240 may include, for example, one or more of, a visible device, (such as a light or a display), an audible device, (such as a bell, whistle, or horn), and a tactile device. Output device 240 may also include a recording device that records the amount of vibration exposure levels experienced by the operator on machine 100. Output device 240 may further include a machine control device, (such as a steering or braking system). For example, as shown in FIG. 5, output device 240 may include a display panel 241, a warning bell 242, and a recording device 243.

INDUSTRIAL APPLICABILITY

The disclosed monitoring system may be incorporated in machines where it may be desirable to determine whole body vibration experienced by an operator of a machine. The proposed monitoring system and method may provide a compact, accurate, and low-cost solution for an operator or owner of a machine to determine whole body vibration experienced by the operator or owner corresponding to a particular type of machine operation. For example, in FIG. 2, by engaging vibration sensor 200 with a portion of safety restraint system 120, and in proximity with the operator, complex data analysis and costly software programs may be avoided. If vibration sensor 200 were placed in a seat cushion of operator seat 105, a transfer function may need to be applied to the vibration measured in order to obtain the vibration exposure level experienced by the operator. In addition, by engaging vibration sensor 200 with a portion of safety restraint system 120, either directly or indirectly, instead of relying on a portable dosimeter, the operator is relieved of the need to remember to separately apply vibration sensor 200. Furthermore, referring to FIGS. 3 and 4, employing barrier system 210 configured to at least partially enclose vibration sensor 200, may provide added protection of vibration sensor 200 from accidental spoilage of any liquid by the operator, from contamination and corrosion due to dirt, dust, and moisture, and from physical damage.

It will be apparent to those skilled in the art that various modifications and variations can be made to the monitoring system of the present disclosure without departing from the scope of the disclosure. Other embodiments will be apparent to those skilled in the art from consideration of the specification and practice of the monitoring system disclosed herein. It is intended that the specification and examples be considered as exemplary only, with a true scope of the disclosure being indicated by the following claims.

What is claimed is:

1. A system for monitoring an exposure of a machine operator to machine vibration, comprising:
   an operator safety restraint;
   at least one vibration sensor engaged with the safety restraint and configured to generate a signal indicative of operator exposure to machine vibration; and
   a controller configured to receive the signal and configured to determine an amount of vibration exposure of the machine operator based on the signal.

2. The system of claim 1, wherein the safety restraint includes at least a belt and a fastening member.

3. The system of claim 2, wherein the vibration sensor is on the belt.

4. The system of claim 2, wherein the vibration sensor is on the fastening member.

5. The system of claim 1, wherein the vibration sensor is at least partially surrounded by a barrier system including one or more polymers.

6. The system of claim 1, wherein the controller is configured to produce an output signal based on the determination of the amount of vibration exposure of the machine operator.

7. The system of claim 6, further including an output device configured to receive the output signal and generate a response.

8. The system of claim 7, wherein the response generated by the output device is at least one of a visible indication, an audible indication, a tactile indication, a recording function, and, a machine control function.

9. A method for determining an exposure of a machine operator to machine vibration, comprising:
   operatively associating a safety restraint with a machine operator;
   detecting machine vibration directed to the machine operator with a sensor engaged with the safety restraint;
   generating a signal with the sensor that is indicative of operator exposure to machine vibration; and
   processing the signal and determining an amount of vibration exposure of the machine operator.

10. The method of claim 9, further including partially surrounding a portion of the sensor with one or more polymers.

11. The method of claim 9, further including
    producing an output signal based on the determination of the amount of vibration exposure of the machine operator; and
    receiving the output signal with an output device and generating a response from the output device.

12. The method of claim 11, wherein generating a response includes generating at least one of a warning signal, a visual indication, and a control function.

13. A machine, comprising:
    an engine configured to provide power to the machine;
    an operator safety restraint for securing an operator of the machine to the machine;
    at least one vibration sensor directly engaged with at least a portion of the safety restraint and configured to generate a signal indicative of operator exposure to machine vibration; and
    a controller configured to receive the signal and configured to determine an amount of operator exposure to machine vibration.

14. The machine of claim 13, wherein the safety restraint includes at least a belt and a fastening member.

15. The machine of claim 14, wherein the vibration sensor is engaged with the belt.

16. The machine of claim 14, wherein the vibration sensor is engaged with the fastening member.

17. The machine of claim 13, wherein the vibration sensor is at least partially surrounded by a barrier system including one or more polymers.

18. The machine of claim 13, wherein the controller is configured to produce an output signal based on the determination of the amount of operator exposure to machine vibration.

19. The machine of claim 13, further including an output device configured to receive the output signal and generate a response.

20. The machine of claim 19, wherein the response generated by the output device is at least one of a visible indication, an audible indication, a tactile indication, a recording function, and, a machine control function.

* * * * *